United States Patent [19]
Jung et al.

[11] 4,234,856
[45] Nov. 18, 1980

[54] GASDYNAMIC SOLAR POWERED LASER

[75] Inventors: Check K. Jung, Brooklyn; Harold E. Whalen, Dix Hills, both of N.Y.

[73] Assignee: Sperry Corporation, New York, N.Y.

[21] Appl. No.: 825,352

[22] Filed: Aug. 17, 1977

[51] Int. Cl.² ............ H01S 3/045; H01S 3/091; H01S 3/223

[52] U.S. Cl. ............ 331/94.5 P; 331/94.5 D; 331/94.5 G

[58] Field of Search ............ 331/94.5 P, 94.5 D, 331/94.5 G, 94.5 C

[56] References Cited

U.S. PATENT DOCUMENTS

| | | | |
|---|---|---|---|
| 3,451,010 | 6/1969 | Maiman | 331/94.5 P |
| 3,786,370 | 1/1974 | Barry et al. | 331/94.5 P |
| 4,042,892 | 8/1977 | Fenneman | 331/94.5 D |

OTHER PUBLICATIONS

Barry et al., IEEE Trans. on Communications, vol. COM-24, No. 4, Apr. 1976, pp. 470-478.

*Primary Examiner*—William D. Larkins
*Attorney, Agent, or Firm*—Howard P. Terry

[57] ABSTRACT

A stabilized-satellite power system located outside of the earth's atmosphere collects solar energy, converting it by dynamic gas laser interaction into a beam of infrared energy directed toward a power utilization station, such as at the earth's surface, the wave length of the infrared energy lying within a non-attenuating passband in the earth's atmosphere. A section of the laser is cooled by a directive radiator system aligned toward outer space.

11 Claims, 16 Drawing Figures

GASDYNAMIC SOLAR POWERED LASER

CROSS REFERENCE BETWEEN RELATED APPLICATIONS

Filed concurrently on Aug. 17, 1977 were two related patent applications in the names of C. K. Jung and H. E. Whalen, Ser. No. 825,348 entitled: "Solar Laser Power System" and Ser. No. 825,352 entitled: "Improved Solar Laser Power System", both assigned to Sperry Rand Corporation.

BACKGROUND OF THE INVENTION

1. Field of the Invention

The invention generally relates to the conversion of solar energy into a form suitable for substantially unattenuated transfer through the earth's atmosphere for use in performing useful work, at the earth's surface or elsewhere, and more particularly concerns a stabilized gas dynamic laser satellite device for the conversion of a broad spectrum of solar energy into a relatively narrow wave length band of infrared energy used remotely for electrical power generation or the like after passage through the earth's atmosphere for example.

2. Description of the Prior Art

It is readily recognized that a vast quantity of solar energy is received daily upon the earth's surface and by its atmosphere and is re-radiated into space and lost, a quantity quite sufficient to supply many present and future needs for electrical and other power. Direct heating and cooling of individual buildings have long been successfully achieved by circulating water or air through solar energy collectors, then storing the heat for later use. Mirrors have been used at the earth's surface to track the sun and to concentrate the solar flux onto a receiver at the earth's surface to generate steam for driving electrical generators.

Photovoltaic arrays at the earth's surface have produced electricity from the sun's rays by a non-thermal process. Natural collection of solar energy takes place on and near the earth's land and ocean surfaces and may be exploited by extracting energy from accumulated rainfall, or from the wind or tides. One of the important conversion mechanisms is bioconversion, whereby growing plants are used to store solar energy that is later released directly by burning the plant or, for example, by chemical conversion of the plant to a fuel such as an alcohol.

Solar energy is not free, anymore so than is power from any other convertible resource; the initial cost of any mechanism for its mass conversion into electrical or other energy of form suitable for distribution by present or future distribution systems is considerable. Of greater significance is the fact that the solar energy received at the earth's surface is highly variable. The time of day (or night), the season of the year, and scattering or attenuation of solar energy due to weather conditions, all seriously affect the solar flux intercepting any area of the earth. However, the solar radiation impinging upon a surface of standard area normal to the sun's rays and disposed above the earth's atmosphere is found to be large and substantially constant.

The problem of efficient conversion of solar radiation to useful electrical or other power has stimulated the publication of several untried suggestions, some radical indeed. Of these suggestions, one which has apparently been given serious consideration was fostered in the article "Solar Power From Satellites" appearing as a release of Arthur D. Little, Inc., in the February 1977 issued of *Physics Today*, pages 30 through 38. So as to enjoy the use of the greater magnitude, more nearly constant solar flux densities available above the earth's atmosphere, it was proposed to assemble in space above the earth's atmosphere enormous arrays of photovoltaic cells held together by a frame having dimensions about 5 by 13 kilometers. The photovoltaic cells would generate sufficient electrical energy to power an array of synchronized microwave generators coupled to a directionally controlled microwave radiating antenna for directing a microwave beam to a receiving antenna positioned at the end of the line of sight, as at the earth's surface. The microwave energy thus arriving at the earth's surface is not in suitable form for direct use and must be converted to a more conventional form if it is to be generally distributed. Furthermore, several microwave oscillators must be frequency and phase synchronized by complex control means.

Essentially, the prior art proposal requires a double conversion process; a narrow band of the solar energy is first converted to high voltage electricity (20 k.v.d.c.) by the solar cell array and the microwave oscillators then convert the high voltage energy to microwave energy. Solar cells having efficiencies of 15 percent have been reported, but experience shows that this value is rarely met and seriously decreases with each year of use. Microwave generators are also relatively inefficient devices and reach reasonably good efficiencies only by the use of heavy devices for producing permanent magnet or solenoid focussed electron beams. Many other factors tend to decrease system efficiency, and overall efficiency of the proposed system does not appear to be attractive in view of the enormous total mass and cost of construction and operation of the system.

For example, it is estimated that the aforementioned approximately 5 by 13 kilometer solar cell array and its associated microwave and control equipment would be transported piece by piece from the earth to be assembled in space. Further, the operating power station would clearly need maintenance during its operating life and the costs of both of these operations are significant in determining the economic feasibility of the concept. Operating costs alone of the huge structure $(18.2 \times 10^6 \text{ kg})$, not including consumables, is significant; the energy cost alone of stabilizing the giant platform can be enormous. Most discouraging is the fact that the vast scope of the structure does not lend itself to a reasonably uncomplex test of a model of size conveniently put into space by a single rocket.

SUMMARY OF THE INVENTION

The present invention provides a means for the efficient collection of unattenuated solar energy at a station outside of the earth's atmosphere and for its conversion at that station in a single conversion process into a beam of infrared energy of a wave length relatively unattenuated by the earth's atmosphere so that it may be directed therethrough to a collector and utilization apparatus located at or near the earth's surface, for example. Solar energy is focused upon a pressure chamber to raise the temperature and pressure of a lasable gas contained therein. The gas is permitted to flow from the pressure chamber through a laser infrared cavity for generating an intense infrared beam directed toward a remote infrared collector. The gas flow from the laser cavity is into a cooled expansion chamber from which it is returned to the laser gas input. Heat is removed from the expansion chamber by directive means oriented toward cold outer space and away from all heat sources such as the sun and the earth.

A satellite power station according to the present invention is compact and relatively efficient, employing a single relatively high efficiency transformation of solar energy into a beam of infrared energy capable of passing through the earth's atmosphere with relatively little loss. Furthermore, the energy in the infrared beam, once reaching its destination, may be used directly, as in a solar furnace or for generating steam. The conversion process takes place in a closed loop system permitting continuous use of the lasing gas normally without its replenishment. Solar cells are avoided as primary power sources so that the satellite may be relatively compact and long-lived. Microwave vacuum tubes and heavy electron beam focussing devices and the attendant needs to generate and to distribute high voltages and for microwave phase and frequency stabilization are all avoided.

DESCRIPTION OF THE PREFERRED EMBODIMENTS

Figure 1:
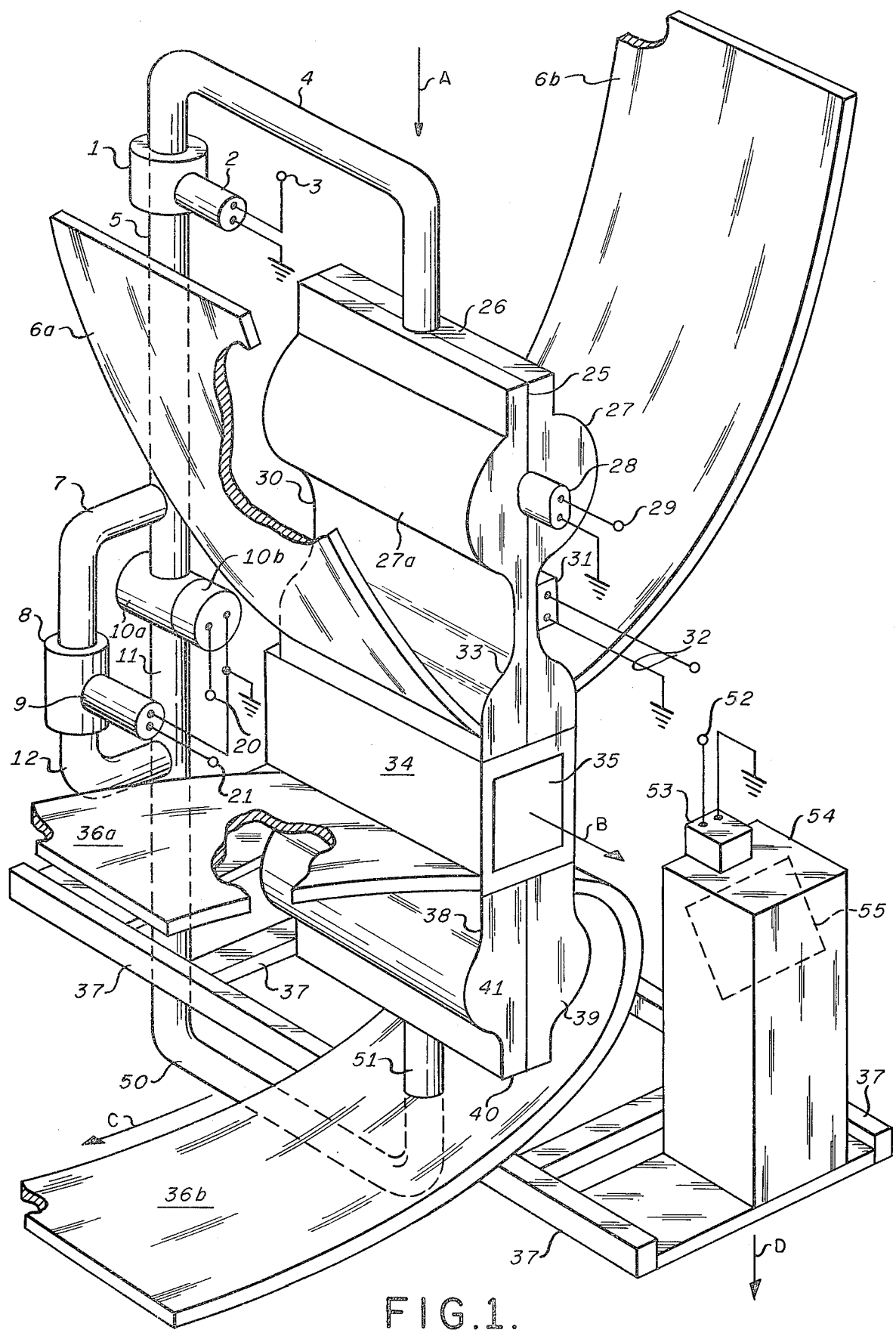
FIG. 1 is a perspective view, partly cut away, of a preferred form of the invention.

Basically, the structure of the novel power generation system includes a transverse flow gas dynamic laser, directional means for efficiently coupling solar energy into a first section of the laser, means for coupling a beam of intense infrared energy from a further section of the laser for productive use, such as at an earthborne or other power utilization device, and means for efficiently cooling a still further section of the laser by coupling degraded energy in the form of heat therefrom into a region of space devoid of significant energy sources. The novel power generation system is preferably stabilized in a generally geosynchronous orbit with respect to the earth and its solar energy directional input is stabilized to maximize receipt of solar radiation by known satellite stabilizer devices such as a sun tracker or an inertial wheel or the like. Such means may be used cooperatively in the conventional manner or in cooperation with other known types of satellite stabilization apparatus, such as radio control systems. For performing the power generation function, the novel transversely excited gas dynamic laser includes the several successive sections seen fully in FIGS. 1 and 10, including a gas input manifold section 26, a pressure section 27, a discharge valve section 30, an expansion chamber section 33, a lasing section 34, an expansion diffuser and cooling section 38, an expansion chamber section 39, a second or output manifold section 40, and a return pipe and pumping loop for coupling the low pressure gas output 51 of the laser to its gas input 4, as will be further described.

Figure 2:
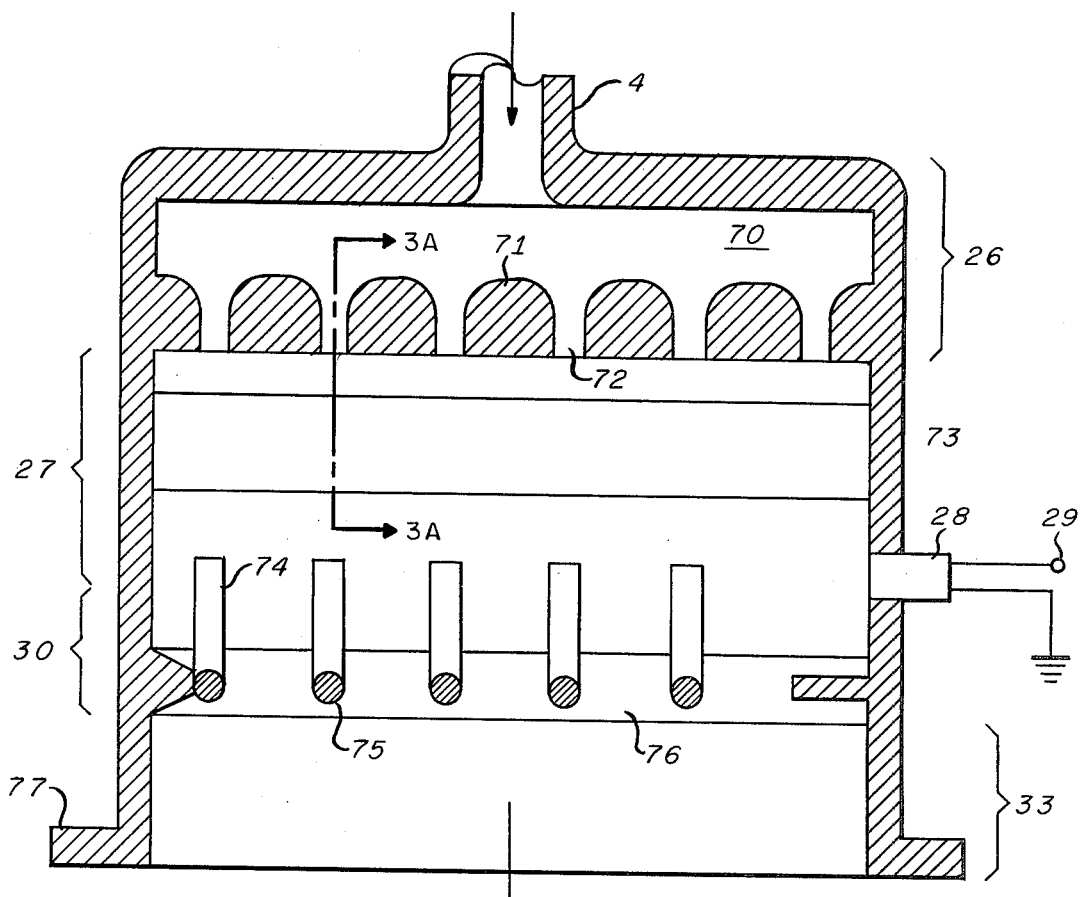
FIG. 2 is a cross section view of the upper portion of FIG. 1.

Referring now both to FIG. 1 and to FIG. 2 where the sections of the laser prior to the actual lasing chamber 34 are shown, details of sections 26, 27, 30 and 33 are illustrated. Receiving the gas to be energized through pipe 4, the input manifold section 26 serves as a distributor, its extended inner chamber 70 directing the gas between a plurality of spaced separators, such as separator 71 and through a corresponding array of intervening passages 72 into the pressure section 27. The several sections of the FIG. 2 element may be formed of unitary mirror-image, welded-together castings of an alloy characterized by high tensile strength, such as one of the readily available molybdenum or tungsten steel alloys, though other alloys may be suitable. The weld between the two castings may be made at line 25, for example (FIG. 1).

Figure 3A:
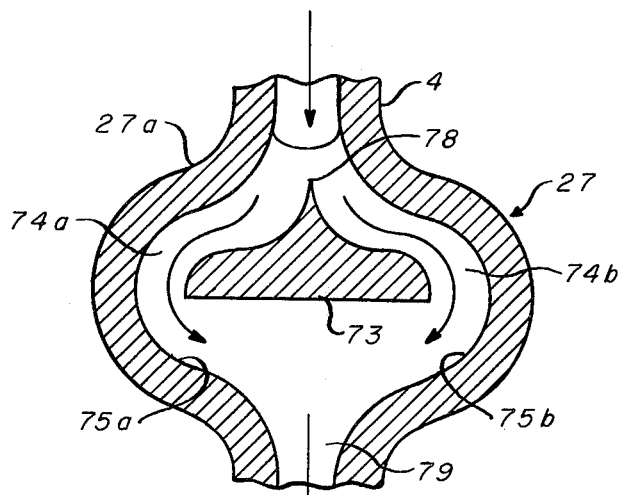
FIG. 3A is a cross section view taken along the lines 3A—3A of FIG. 2.
Figure 3B:
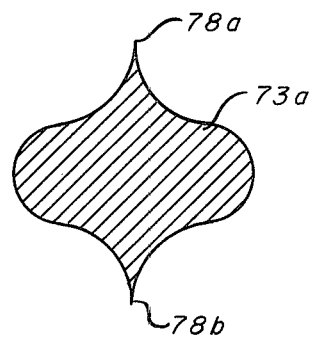
FIG. 3B is a cross section view of an alternative structure of an inner part of FIG. 3A.

The passages 72 communicate directly with a pressure section 27 where solar energy is used to heat the gas found therein to a temperature of 1500° K. at 14 to 17 atmospheres, for example. Accordingly, the exterior generally cylindric surface 27a of pressure section 27 is coated with a suitable electromagnetic energy absorber material, such as pyrolytic graphite, for example, so that it may act as a black body absorber of the concentrated solar rays. The outer surface of manifold section 26 may be similarly treated. The thermal energy thus collected flows inward through the walls of pressure section 27 whose interior is seen more clearly in one form in the cross sectional view of FIG. 3A. Interior of the extended chamber 27 is an extended wedge-shaped, smooth-surfaced divider element 73 of the general shape indicated. The extended pointed edge 78 of the gas-flow divider 73 beneficially bisects the flow of gas supplied by the several passages 72. This action not only substantially equalizes laminar flow through the opposed extended passages 74a, 74b, but advantageously tends to force the flowing gas against the full length of the respective curved and smooth surfaces 75a, 75b, thus substantially enhancing laminar flow and efficient heat flow from the wall of container 27 into the gas. The particular shape shown for flow divider 73 in FIG. 3A is considered to be representative of a variety of sharply edged symmetric shapes that might be employed for the purpose. Other more fully symmetric shapes may be used, like that of FIG. 3B having smooth surfaces and opposed extended sharp edges such as at 78a, 78b. The FIG. 3B arrangement further aids laminar flow of the gas out of pressure section 27 via the extended lineal channel 79 into the next-following expansion section.

In order that gas may be pumped by means yet to be described into the pressure chamber 27 of the device at a high pressure for intense absorption of thermal energy and so that the energetic gas may then be released into the laser section 34, the pressure chamber 27 may be closed for an appropriate period of time by valves located in a discharge valve section 30 of the device. While the illustrated section 30 valves may take any of several known forms of quick-acting gas valves, the arrangement shown in FIG. 2 utilizes an array of swinging gate valves, such as alloy steel gate valve 74, each rotatable upon a shaft at one side of the corresponding valve, such as about shaft 75. The valve shafts 75 extend through a supporting friction-free bearing enclosure 76 to the outside of section 30 into a torquer housing 31 (FIG. 1). As in FIG. 4B, the several torquers 120 may be mounted within a suitable housing 31 for excitation in one sense or the other by a reversible unidirectional command voltage applied at terminals 32.

Figure 4A:
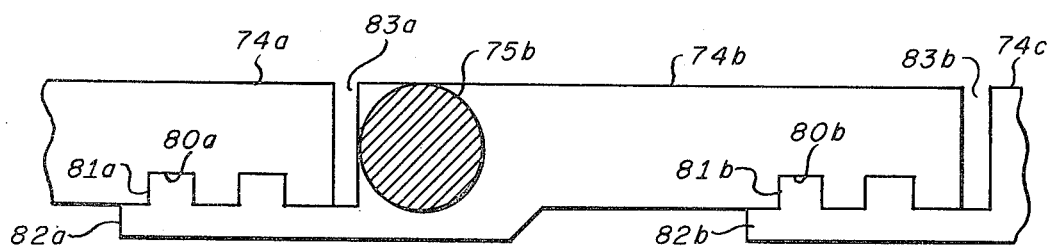
FIG. 4A is a large scale view of an interior part of FIG. 2.
Figure 4B:
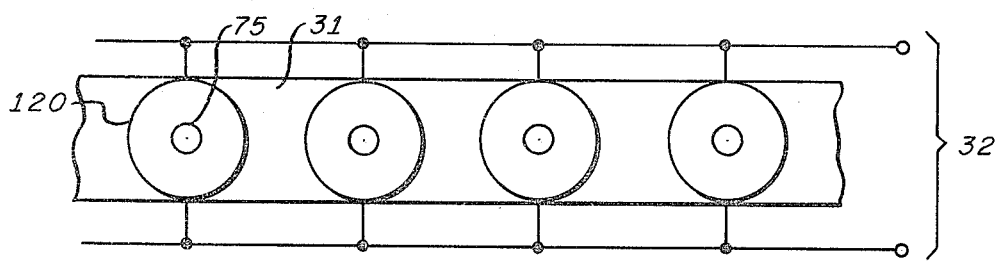
FIG. 4B is a fragmentary view of an exterior part of FIG. 2.

The array of valves 74 is shown open in FIG. 2 for permitting discharge of the gas into the smooth sided expansion chamber 33 while, in the larger scale drawing of FIG. 4A, adjacent valves 74a, 74b are shown in their closed positions. It is seen from FIG. 4A that the several gate valves 74 of the array may be equipped with interlocking or intermeshing elements to restrict gas leakage into expansion section 33 when the gate valves 74 are closed. For example, when gate valves 74a, 74b are simultaneously closed, the parallel grooves 80a in the face of valve 74a are meshed with corresponding parallel teeth 81a, teeth 81a being appropriately supported on an arm 82a extending from gate valve 74b. Similarly, the parallel grooves 80b in the face of valve 74b are meshed with corresponding parallel teeth 81b, teeth 81b being supported on an arm 82b extending from gate valve 74c, et cetera. Further, the several gate valves 74 are so arranged that the pressure of the compressed gas when restrained by them tends to hold the several gate valves firmly shut, further eliminating gas leakage into expansion chamber 33. The pressure of the gas in pressure section 27 may be measured by a conventional pressure pick off 28 (FIG. 2) as a voltage on terminal 29 for purposes yet to be explained.

To make the sections 26, 27, 30, 33 of the apparatus fully functional, concentrated solar energy must be applied to the pressurized gas within pressure section 27 before it is permitted to flow into expansion section 33. For this purpose, the platform frame 37 supporting the device is oriented by conventional solar tracking equipment so that a solar energy collector is always oriented for collecting maximum solar energy and so as to apply it efficiently to the external black body surface 27a of pressure section 27. The directed collector may take any of several forms, of which a cylindrical parabola form is shown in FIG. 1. Half parabola cylinders 6a, 6b are shown in the figure affixed at their ends for convenience near the parabola vertex to the outer sides of expansion chamber section 33. It will be obvious to those skilled in the art that additional supporting and strengthening frame elements of conventional nature, such as tie rods 164 of FIG. 10, may be used with solar collector 6a, 6b and it will be understood that such elements are generally omitted from the drawings as a matter of convenience and because they do not necessarily form an essential part of the invention. It will also be understood that suitable equipment for stowing the half parabolas and the parts of other energy directing elements yet to be described and for releasing them into their operating positions is readily available in the art and that details of such apparatus are quite properly omitted from the drawings in the interest of avoiding needless complication thereof. The surfaces of the half parabolas 6a, 6b facing the absorbing surface 27a are treated so as to render them as nearly as possible one hundred percent reflecting for solar energy. Polished stainless steel sheets or nickel steel optically coated with aluminum are suitable, though other materials may be employed.

Figure 5:
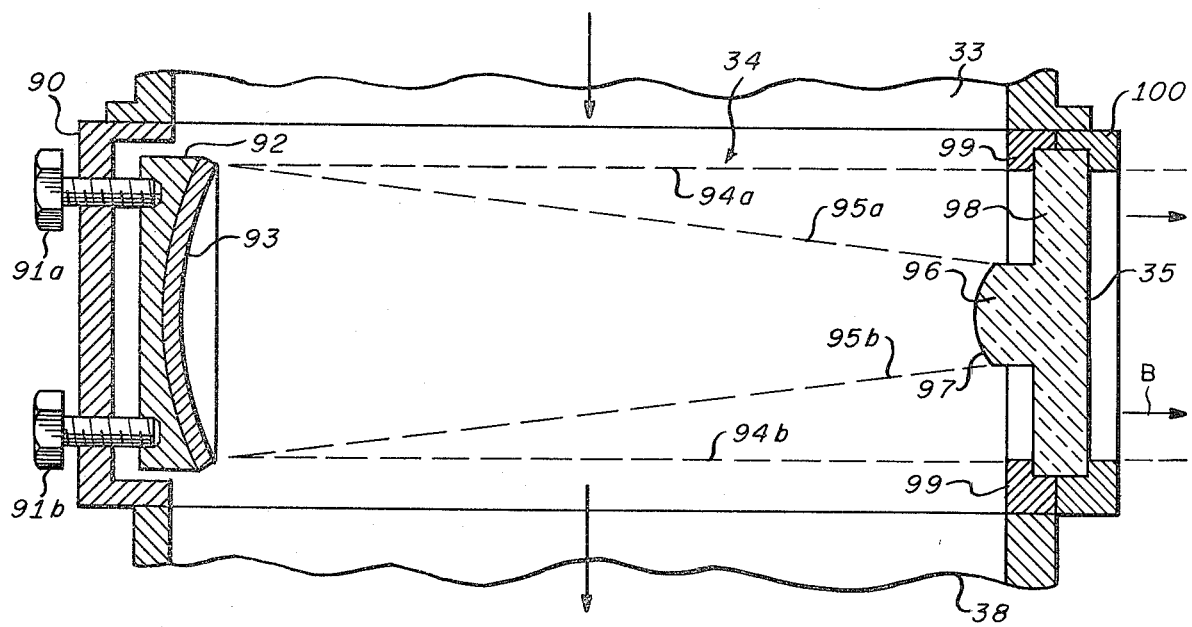
FIG. 5 is a cross section view of a second portion of FIG. 1.

When gate valves 74 are opened, the hot, high-pressure gas expands at a supersonic rate and flows through the extended slit at 76 (FIG. 2) into expansion region 33, whose smooth interior walls aid laminar flow of the gas into the lasing section 34 whose interior is shown in FIG. 5. In the preferred form of the invention, an output infrared energy beam represented by arrow B of FIG. 1 is produced having maximum total power because of the large volume of interacting gas.

For realizing the benefits of an unstable lasing cavity, a concave reflecting surface 93 is supported at a first end wall 90 of the lasing cavity 34. It cooperates with a partial-reflector partial-window element 35 supported in the wall 99 opposite mirror 93; element 35 has a central reflector surface 97 and an annular window portion 98 concentric with reflector surface 97.

Figure 6:
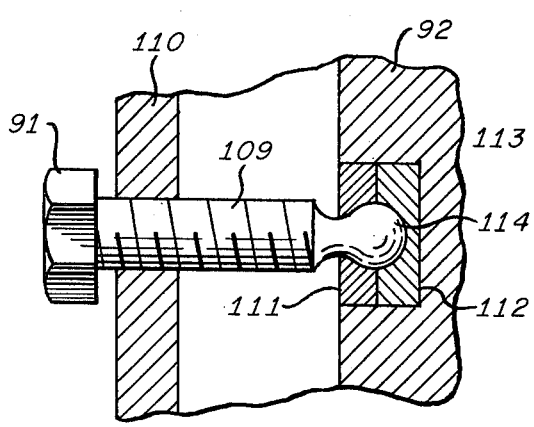
FIGS. 6 and 7 provide fragmentary enlarged scale views of parts of FIG. 5.

Concave mirror surface 93 is shown in FIG. 5 as supported on a conformal backing substrate 92 and may be made of polished copper with an optically reflecting film of gold or other substance having nearly one hundred percent reflectivity for the radiation produced by the laser which, for example, may be 10.6 micron wave length radiation. The substrate 92 may be supported from end wall 90 by a plurality (preferably three) of screws such as screws 91a, 91b passing through corresponding threaded bores in wall 90. If desired, the substrate 92 may be fully supported within the laser cavity, as in FIG. 6, by similar screws 91 having a threaded part 109 passing through a wall 110 of a bracket disposed fully within the cavity near wall 90. Annular inserts 111, 112 fixed within a bore 113 in substrate 92 capture a spherical bearing 114 at the end of threaded part 109, permitting ready tilting or adjustment of the optical axis of concave reflector 93 during assembly of the apparatus.

The optical element 35 at end wall 99 is an integrated structure composed of a material highly transparent to the output infrared energy of the lasing region 34. For example, both crystalline NaCl and KCl are well known to be highly transparent to infrared energy, such as in the vicinity of the 10.6 micron wave length. Other known suitable materials include germanium and commercially available alloys of ZnSe, CdTe, or GaAs.

Figure 7:
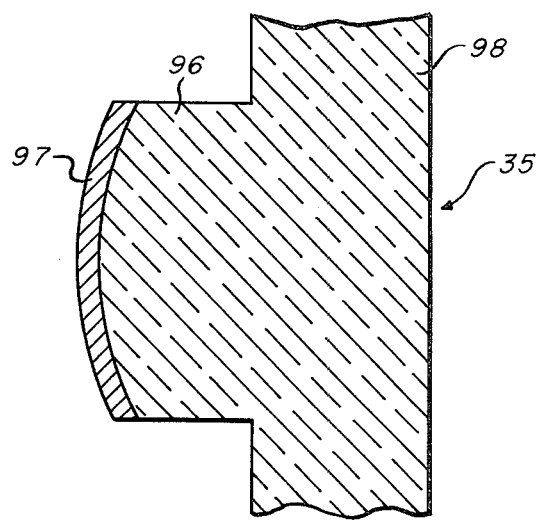

As seen more clearly in FIG. 7, optical element 35 includes a central raised portion 96 having a convex surface on which is formed a highly reflecting film 97 of gold or the like by a conventional vacuum distillation process, as may also be used to form the reflecting film 93. The raised reflector 97 and the central portion 96 are integral with annular window 98. The periphery of window 98 is held against wall 99 by a suitable retainer 100 which may be affixed in hermetic relation to wall 99 by suitable fasteners or by commercially available adhesives such as an epoxy resin.

While varieties of gases and gas combinations are found to yield efficient generation of energetic output beams at various infrared frequencies and may be employed according to the present invention, a system yielding high energy from solar excitation is preferably based on the gas dynamic laser principle. For example, $CO_2$ would be used as the principal laser gas, since it very efficiently generates an energetic 10.6 micron wave length output beam. In a typical example, the laser gas would consist of about 95 percent nitrogen and 4 percent $CO_2$, the remainder being made up of He, as often employed in transverse flow lasers. Water vapor may be used in addition to or in place of He, and other combinations of gases may be employed. Furthermore, the presence of a good optical pass band at about 10 microns in the gases forming the earth's atmosphere makes the $CO_2$ laser further attractive for present purposes. It is found that intense solar heating of the gas mixture and its subsequent cooling by rapid expansion to very high velocities efficiently produces the large population inversion needed in the present invention for power generation at a remote site. Other energy exchange mechanisms, such as chemical lasing reactions induced by solar heat, may be found suitable for use in the present invention.

Figure 8:
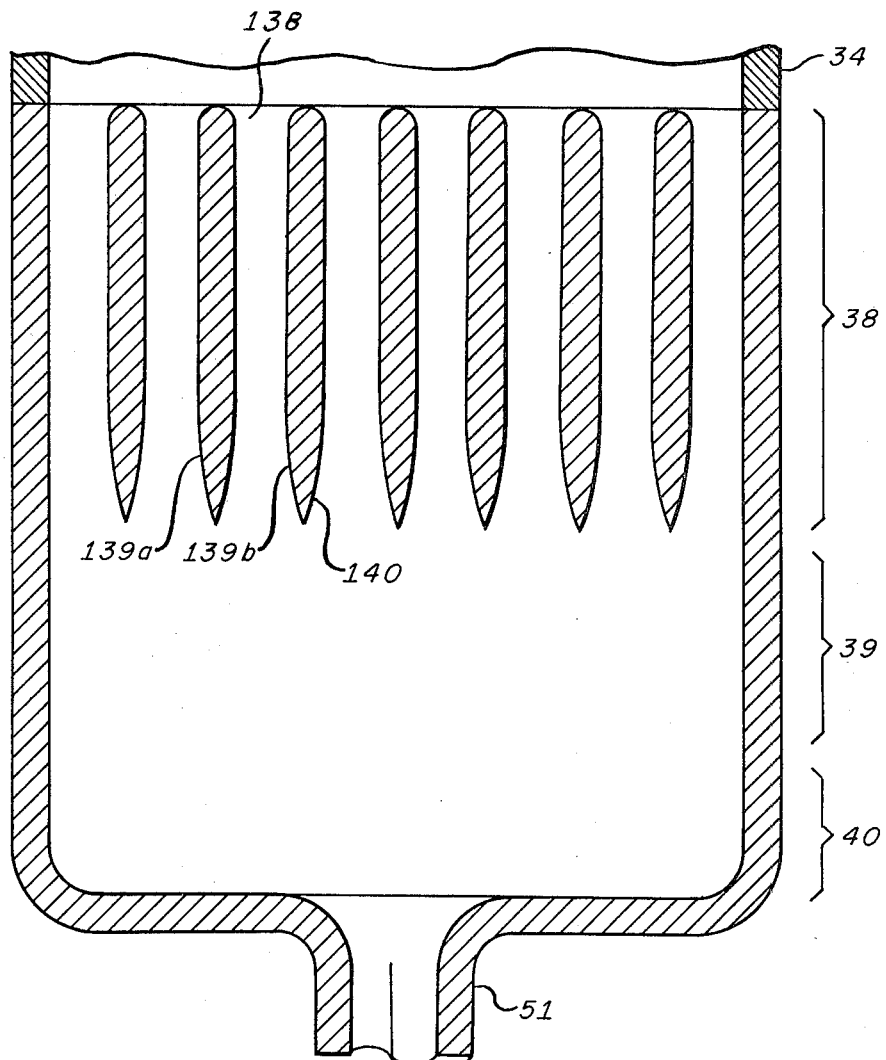
FIG. 8 is a cross section view of the lower portion of FIG. 1.

The active gas flows at high velocity from the expansion chamber section 33 through lasing section 34 and then into the diffusion section 38 of FIG. 8. In the lasing section of FIG. 5, an intense infrared energy beam is generated between the curved end mirrors 93, 97 which cooperate in determining the effective resonance state of the optical cavity. While a major portion of the infrared energy is reflected back and forth between curved mirrors 93, 97, as between the boundaries 95a, 95b, some energy is continuously coupled out of the cavity. The part of the beam of energy lying between boundaries 94a, 94b and not intercepted by reflector 97 passes out through annular window 98 to form the useful annular output beam B. Thus, the invention converts solar energy received in outer space where the sun's rays are unattenuated, the conversion occurring in a single efficient and uncomplex stage. The invention uses gas dynamic laser techniques to give rise to intense population inversion in the supersonic expansion of the solar heated gas, producing the powerful infrared beam B whose wave length falls in an atmospheric pass band for ready propagation to the earth's surface or to other selected targets.

FIG. 8 illustrates the successive sections 38, 39, 40 following the lasing section 34; it is the objective of these three final sections to cool the laser gas after it passes lasing section 34 as much as possible so that it is relatively very cold upon reaching the output manifold section 40. As seen in FIGS. 1 and 8, the final part of the device may again be formed of mirror-image castings of a high tensile strength alloy, the opposed parts being unified, as by welding along the line 41 in FIG. 1. In FIG. 8, it is seen that the diffusion section 38 includes an array of dividers like side-by-side dividers 139a, 139b defining an array of intervening parallel passages such as passage 138. The ends of the dividers may have rounded or pointed shapes, as at 140, to facilitate non-turbulent flow through passages 138. Gas flow is next into an expansion chamber 39, seen in FIG. 1 as having an expanded cylindrical character generally like pressure section 27. Here, the exhaust gas, which is partially cooled in flow through passages 138, enjoys significant further cooling by expansion, falling to about a tenth of an atmosphere pressure before passage into manifold section 40 and exit through pipe 51. Though manifold 40 is shown as a simple continuation of expansion chamber 39, the output manifold 40 may have the general configuration of input manifold 26 as seen in FIG. 2.

As mentioned in the foregoing, it is particularly desirable to cool the final expansion chamber 39 and manifold 40 as far as possible. According to the present invention, the cylindric expansion chamber 39 is protected from receiving heat from all significant heat sources, such as by the parabolic cylinder system 36a, 36b shown in FIG. 1. It is convenient to fasten segments 36a, 36b of the parabolic system to opposite exterior sides of the expansion diffuser section 38, for example as shown in FIG. 1, so that the parabolic axis or plane of symmetry thereof is at right angles to the plane of symmetry of half parabolas 6a, 6b. In this manner, the parabola segments 36a, 36b, which may be constructed generally similarly to half parabolas 6, 6a, are oriented so that they can collect none of the sun's rays, nor can they collect energy from the other significant radiator on the scene, which is the earth itself and its atmosphere. In addition, the parabola segments 36a, 36b cannot collect any significant energy from the laser output beam B, nor from its beam D after being diverted toward the selected target by the controlled mirror 55. In fact, the only thing seen by the parabola system 36a, 36b is cold outer space, a condition highly desirable for most efficient operation of the expansion chamber 39 and its immediately associated parts. Of course, this desirable condition is sustained when the platform frame 37 is stabilized about both pitch and roll axes and when the parabola system 6a, 6b is directed precisely at the sun in the usual manner.

To complete the description of apparatus required to make the system of FIG. 1 function, it should be observed that the gas exhaust pipe 51 is coupled by pipes 50 and 11 to a gas pump such as, for example, a turbine pump 10a driven by motor 10b when electrical power is supplied at its terminal 20. The output of pump 10a is coupled by pipe 5 through valve 1 and pipe 4 to the gas input manifold 26 of the laser. The state of valve 1 is controlled by the presence or absence of a control voltage at the terminal 3 of solenoid 2. A means of by-passing pump 10a from pipe 11 to pipe 5 is supplied by the series connected pipe 12, valve 8, and pipe 7, the state of valve 8 being determined by the presence or absence of a control voltage on the terminal 21 of solenoid 9. It will be understood by those skilled in the art that the figures in this case are drawn to scales such as to make the drawings readily understood, and that the particular dimensions shown would not necessarily be used in practice. The small amount of electrical power required to operate pump 10a and the associated valves 1, 8 and control circuits may be derived in the usual manner from an array of solar cells 153 seen in FIG. 9 as supported upon support links 155a, 155b in front of frame 37 so as to intercept sufficient sun light to provide the required power at terminal 154. Support links 155a, 155b may be supplied with suitable stowing means for initially placing the solar cell array in its operating position.

While the invention is not at all limited to the arrangement to be illustrated by the following example, the example is none-the-less given to aid the further appreciation of the structure and operation of a typical configuration of the novel device. It will be understood by those skilled in the art that the device may be scaled according to usual engineering rules, the power output to be expected being substantially a function of the square of the volume of gas actively interacting with the incoming solar energy. For example, it is estimated that a configuration employing a flow rate of about 100 grams of $CO_2$ per second along with about 570 grams of $N_2$ per second may be constructed to generate 3500 watts with the system in a continuously operating mode. The pressure and heating chamber 27 of FIG. 1 would be substantially 8 inches in internal diameter and 60 inches long. The internal diameter and length of chamber 27 are selected to be compatible with a readily achievable parabolic collector 6a, 6b. The optically active laser chamber is arranged to be spaced only a few inches from the discharge valve chamber 30, with the cross-section area of the expansion chamber 39 being substantially fourteen times the cross-section area of the discharge valve system of section 30, thus beneficially affording efficient supersonic flow of the gas through the laser chamber 34. Outside of the earth's atmosphere, the radiant energy of the sun falling on collector 6a, 6b is approximately 1500 watts per square meter of the collector surface, so that the parabolic concentrator 6a, 6b need have an area only about four square meters, allowing for minor reflection losses. The parabolic cooling reflector system 36a, 36b will generally be similar in size to the solar collector 6a, 6b. In general, the pressure section 27 may reach temperatures as high as 1400° K. or greater; the solar collector 6a, 6b is designed so that pressure section 27 does not reach so high a temperature that the gas molecules actually disassociate, such action being undesirable in the present invention. The cooling produced by the cooling elements 36a, 36b is such as not to freeze any of the gas components, such as $CO_2$ in the example being discussed.

As previously noted, stabilization of platform 37 may be accomplished by the use of a well known radio or inertial stabilization system so that the focal plane of solar energy collector 6a, 6b is always directed toward the sun. In a similar manner, the mirror 55 is automatically directed by well known means toward a desired target which may be earth-bound or extraterrestrial. The coordinates in space of the apparatus of FIG. 1, such as when it is in a synchronous orbit, are known as are the coordinates of a target power station located on the surface of the earth. A conventional computation may be performed as in FIG. 11, for example, by a conventional control computer 200 provided with conventional manual or other input means as indicated at 200a and 200b of the necessary angles at which mirror 55 must be disposed so that the infrared ray D is properly directed toward the cooperating target.

Figure 11:
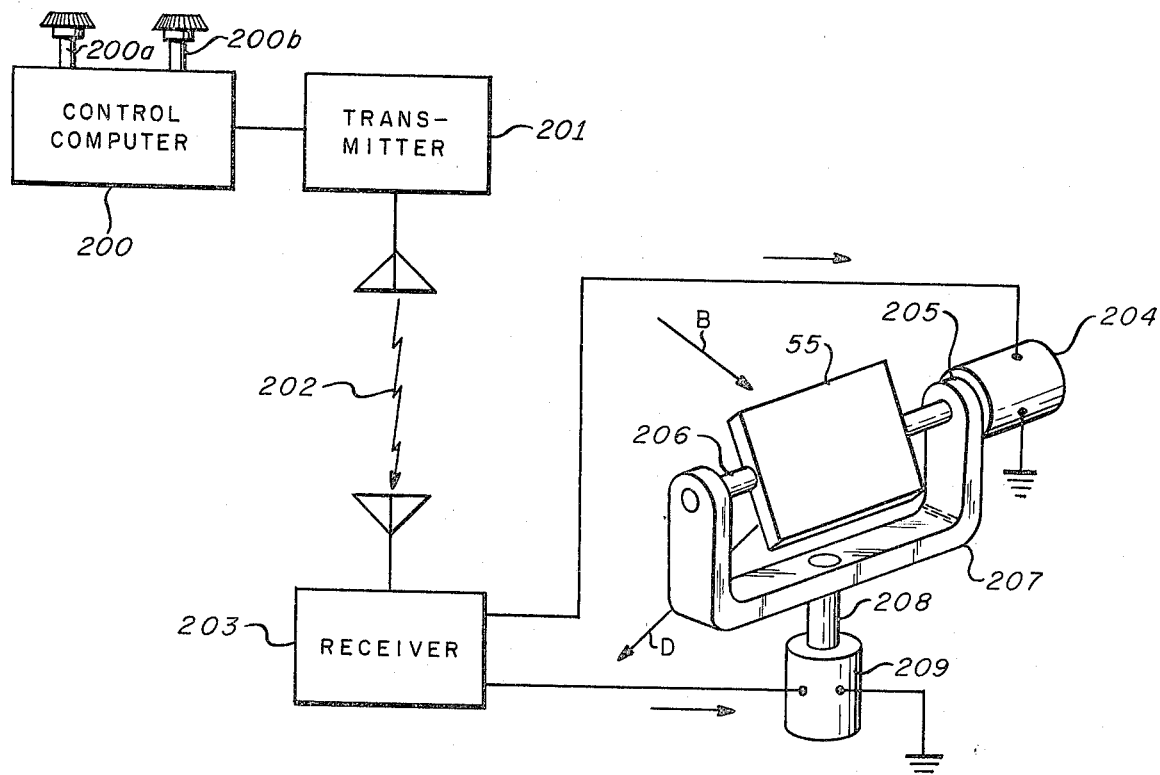
FIGS. 11, 12, 13, and 14 are diagrams of telemetric controls used in operating the apparatus of FIG. 1.

In FIG. 11, the angular command data is applied in transmitter 201 as suitable modulations upon a carrier wave space-radiated from the earth as indicated by arrow 202 to be detected by a receiver 203 disposed on platform frame 37. The angular data, after demodulation in receiver 203, is used to position the rotors of torquers 204 and 209. It is seen that mirror 55 is mounted for positioning about mutually perpendicular axes. Shaft 206, driven by torquer 204, is journalled in the arms of yoke 207 for rotation about a second axis coinciding with shaft 208 by torquer 209. Other well known data transmitter devices may be substituted.

Figure 12:
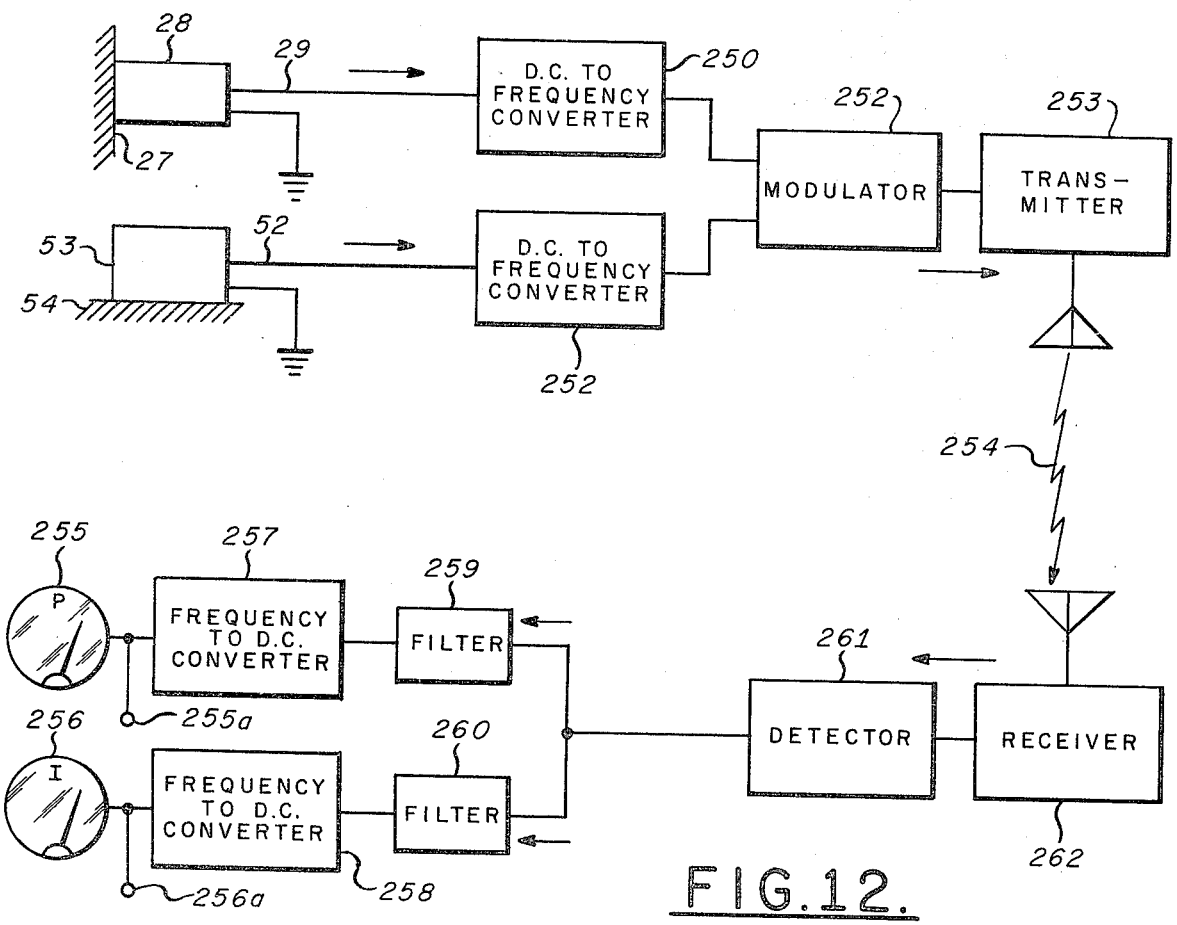

Once mirror 55 is correctly aligned, platform 37 having previously been stabilized, the power converter system may be put into operation. As an aid in this and in subsequent periods, the apparatus of FIG. 12 may be employed. The pressure pick-off 28 associated with the pressure section 27 is coupled via lead 29 to a conventional d.c.-to-frequency converter 250 which, in turn, supplies an output signal having a frequency directly proportional to pressure to modulator 252. The frequency is supplied as a modulation upon a carrier then transmitted by transmitter 253 by space path 254 toward the earth. In a similar manner, other data relating to the operation of the apparatus of FIG. 1, such as the output of photocell 53, may be supplied to a similar d.c.-to-frequency converter 251 and then to modulator 252 for transmission in a similar conventional manner toward the earth.

At the earth's surface, for instance, the radiations of transmitter 253 are received by receiver 262 and are detected at 261. While the frequencies of the signals generated by converters 250 and 251 may vary over a considerable range, they each lie in separate pass bands and are readily separated by a pair of filters 259 and 260 respectively covering corresponding separated pass bands. For example, the first signal frequency passing only through filter 259 may be supplied to utilization apparatus or may be converted to provide a pressure display on d.c. monitor meter 255 by a conventional frequency-to-d.c. converter 257. In a similar manner, a second signal frequency passes only through filter 260 and is supplied to utilization apparatus where it may be converted to provide a light intensity display on d.c. monitor meter 256 by frequency-to-d.c. converter 258. By the observation of meters such as monitor meters 255, 256, an operator is made aware of the operating status of the novel device of FIG. 1. Direct use for control purposes of the signals appearing on terminals 255a and 256a may also be made.

Figure 13:
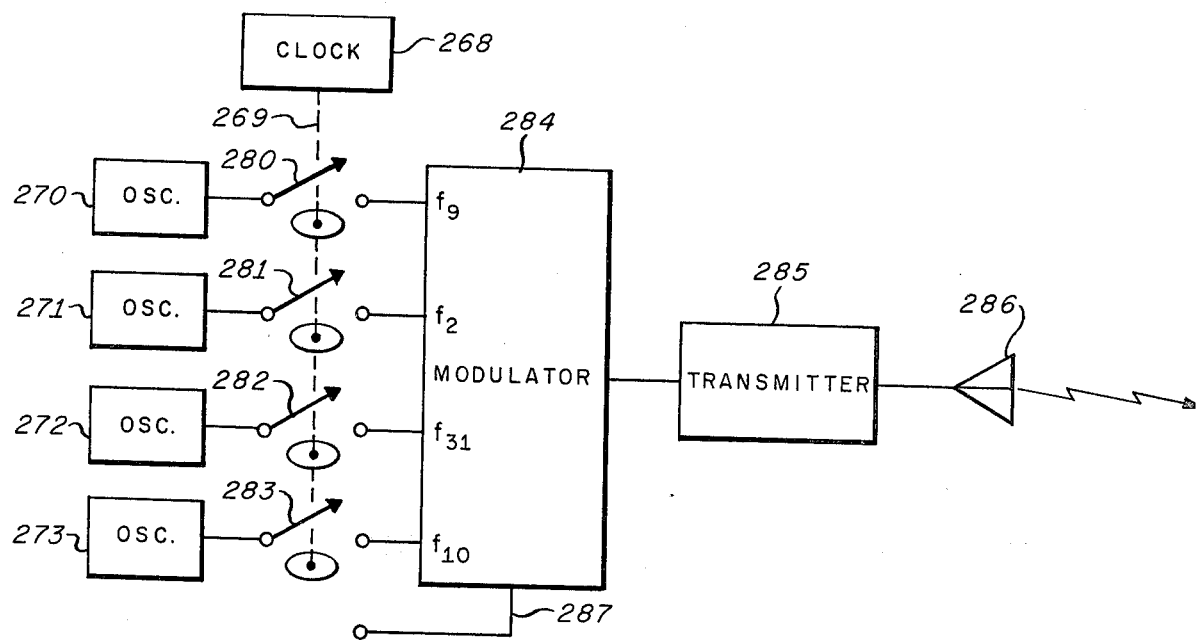

During operation of the apparatus of FIG. 1, it is desired to control at least valves 1, 8, and 30 and pump motor 10b. For this purpose, a control unit such as shown in FIG. 13 may be employed at the earth's surface, for example. Fixed frequency oscillators 270, 271, 272, 273 are used selectively to supply corresponding command signals in the form of discrete fixed frequencies upon depression or latching of any one of the respective associated switches 280, 281, 282, 283 to modulator 284. Additional oscillators and switches may be supplied, as indicated by terminal 287. The selected command frequency or frequencies are applied by modulator 284 to the carrier present in transmitter 285 for radiation by antenna 286 toward the satellite.

Figure 14:
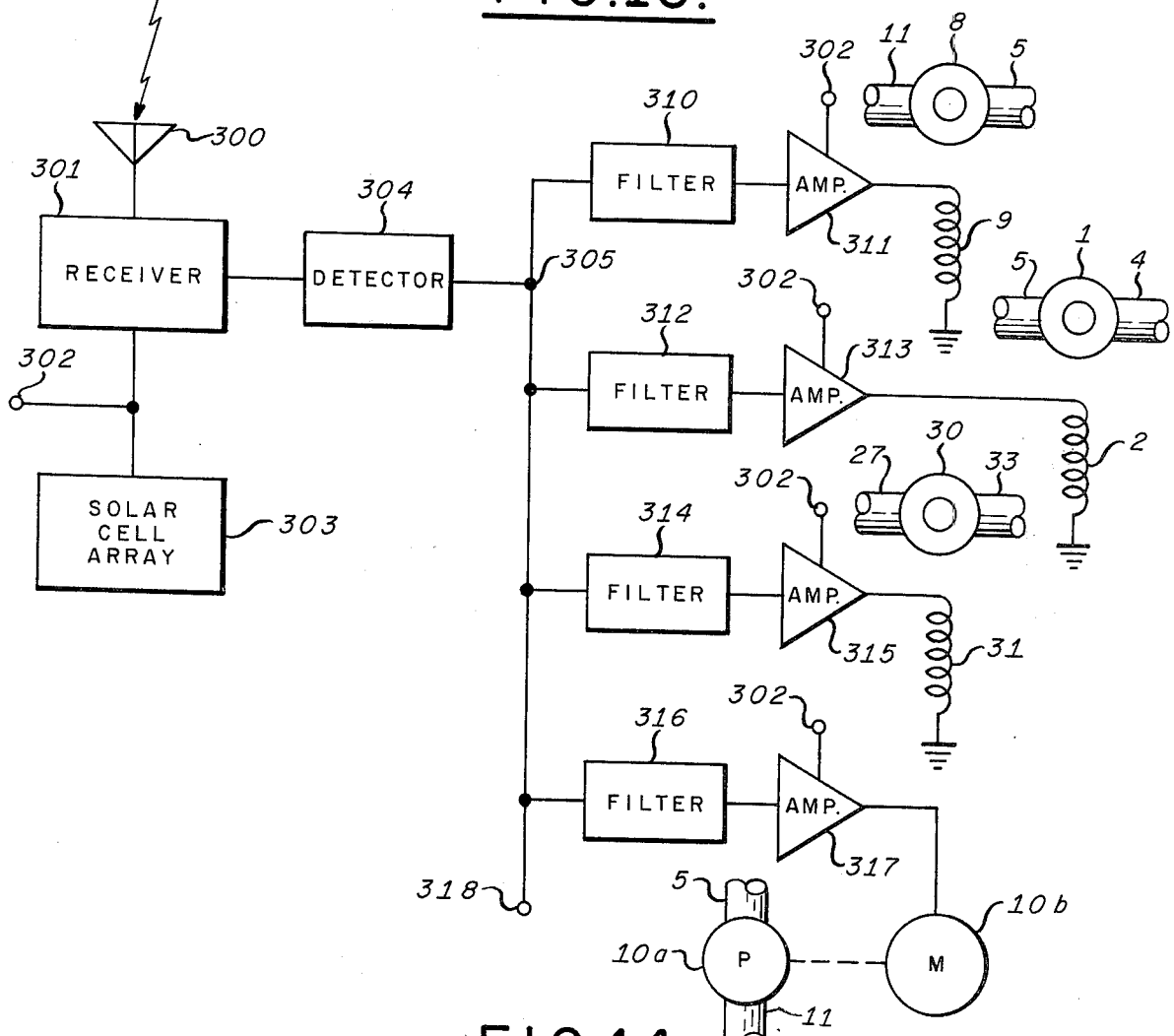

Disposed on the platform frame 37 of FIG. 1 is an antenna 300 and receiver 301 (FIG. 14) cooperating with transmitter 285. Receiver 301 is powered by a solar cell array 303 which may be the same as the array 153 of FIG. 9; other elements of the system may also be powered by the solar cell array 303 via terminal 302, especially as indicated in FIG. 14. The output of receiver 301 is detected at 304 and appears on bus conductor 305 as a signal frequency or frequencies corresponding to the depressed switch or switches of FIG. 13.

Only the frequency $f_9$ of oscillator 270 passes filter 310 and is amplified by a.c. amplifier 311 for excitation of solenoid 9 which serves to operate valve 8. In a similar manner, only the frequency $f_2$ of oscillator 271 passes filter 312 and is amplified by a.c. amplifier 313 for excitation of solenoid 2 which serves to operate valve 1. Likewise, only the frequency $f_{31}$ of oscillator 272 may pass through filter 314 and may be amplified by a.c. amplifier 315 for excitation of solenoid 31 for operating valve 30. Other valves or elements may be similarly controlled. For example, only the frequency $f_{10}$ of oscillator 273 passes through filter 316 to be amplified by a.c. amplifier 317 for driving the motor 10b which spins turbine pump 10a. Other devices to be controlled may be coupled to terminal 318, for example.

In starting operation of the invention, the solar cell array 303 has activated receiver 301, platform 37 having been stabilized, and mirror 55 is directed at the desired target station. In the manually controlled version of the invention, the operator closes valve 30 by depressing switch 282, closes valve 8 by depressing switch 280, and runs pump 10a by closing switch 283 and running the pump motor 10b. This adjustment continues until the gas within pressure section 27 has reached the desired high pressure, as indicated by pick-off 28 and meter 255, and the corresponding temperature by virtue of solar radiation impinging upon its outer surface 27a. The device is now ready for the continuous production of the infrared energy beam D.

Such continuous power conversion is initiated by releasing switches 280 and 282, so that the respective normally open valves 8 and 30 return to their normal open positions. Motor 10b may be allowed to continue operation or may also be allowed to stop. The sudden opening of the array of discharge valves in section 30, aided by the extremely cold state of expansion chamber 39, produces a gas supersonic laminar flow through the laser chamber 34 with consequent lasing action. Because of the continued supersonic flow of the gas, it is significantly cooled by expansion in chamber 39 and is continuously returned via pipes 50, 11, 5, and 4 to the pressure section, there to be reheated so that the flow through the loop is a continuous supersonic flow. Operation may be ended at any time simply by closing valve 1 or valve 8, for example, by depressing one of the respective switches 281 or 280.

The invention may be operated continuously or to provide pulses of infrared energy. For pulsed operation, it is started as in the continuous operation mode and may be deliberately stopped after an arbitrary time period, as in the foregoing. On the other hand, it may readily be designed so that the pressure level in pressure chamber 27, as indicated by pick-off 28, will gradually fall to a level such that laser action automatically ceases. Such cessation may also be readily detected by the operation of photocell 53 as indicated by meter 256. At a predetermined minimum for the pressure or light intensity values, operation may be operator re-initiated, as in the foregoing. Alternative to manual control of operation in the pulsed mode, it will be understood that cyclic starting and stopping of the operation may be automatically achieved simply by the use of a clock motor 268 (FIG. 13) driving a multiple cam assembly 269 which depresses switches 280 through 283 in the foregoing desired order and empirically determined durations.

Figure 9:
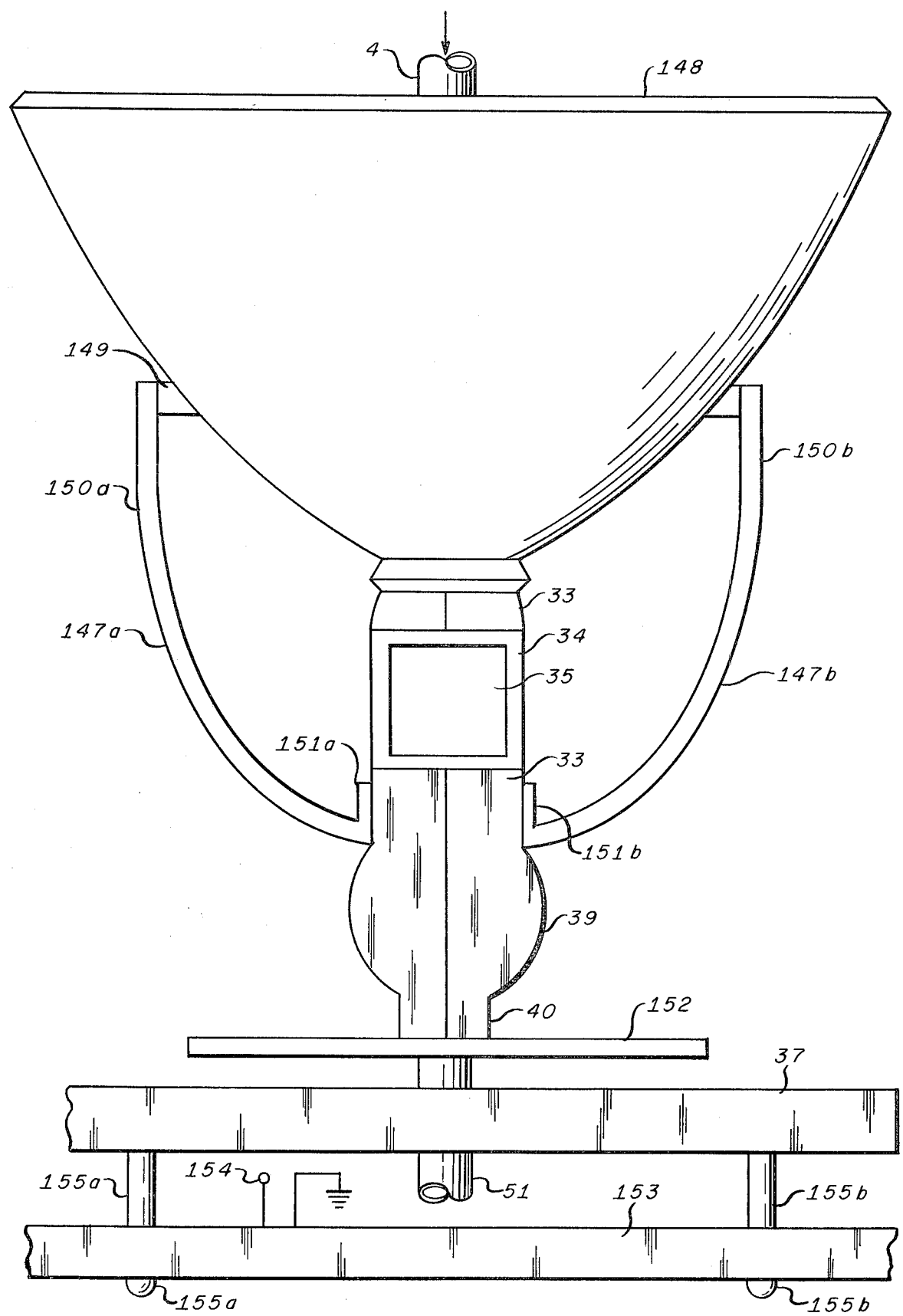
FIGS. 9 and 10 are plan views of alternative forms of the invention.
Figure 10:
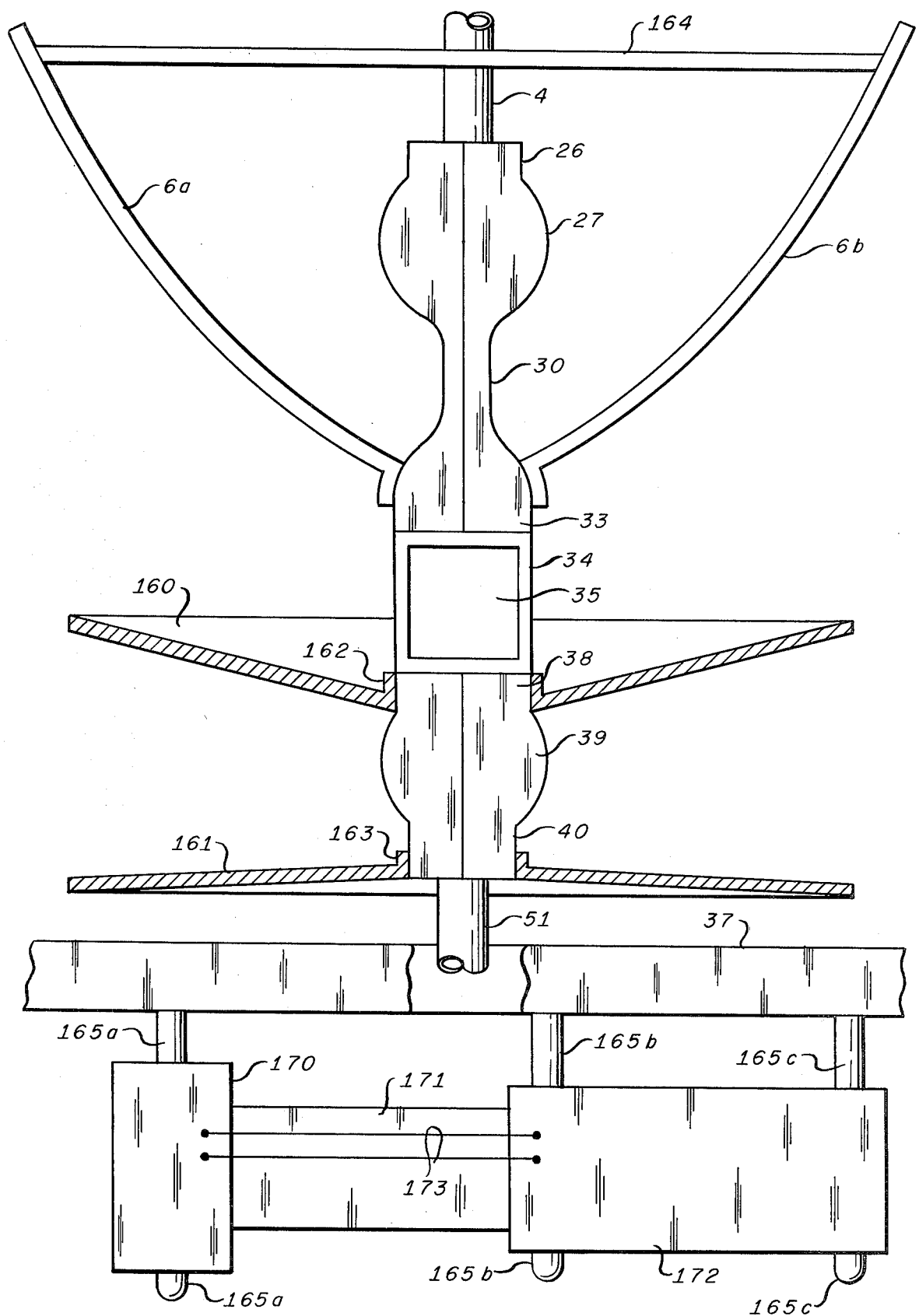

It is within the scope of the present invention to employ other solar energy collector systems in place of the half parabolas 6a, 6b of FIGS. 1 and 10. For example, FIG. 9 illustrates a preferred form of the invention in which a paraboloid of revolution 148 is substituted for the half parabolas 6a, 6b. The structure of FIG. 1 may also be altered beneficially and strengthened by using two pairs of half parabolas like the pair 6a, 6b, but disposed so as to form a generally rectangular or even a square pyramidal solar collector. In FIG. 9, the cooling of the expansion chamber 39 is further aided by a combination including oppositely curved sheets 150a, 150b fastened for good heat transfer at one end to the respective flanges 151a, 151b to opposed sides of expansion chamber diffusion section 33 just above expansion section 39. The curved sheets 150a, 150b are further fastened at a thermally insulating barrier 149 to opposed parts of paraboloid 148, or to half parabolas 6a, 6b. The outer surfaces 147a, 147b of sheets 150a, 150b are coated with respective films of a highly radiative thermal material such as pyrolitic graphite, for example, so that heat flowing upward in the thermally conductive sheets 150a, 150b is efficiently radiated toward cold outer space. The lower shield 152 is applied at the bottom of exhaust manifold 40, though it may form part of frame 37. The effect of shield 152 is again to shield the cold surfaces of elements 39 and 40, and of 150a, 150b, if desired, from radiation coming from the earth. In this manner, the elements 150a, 150b, 152 shield the structure 39 to be cooled as in the arrangement of FIG. 1 and furthermore act efficiently to couple the major surfaces of expansion chamber 39 to space. Coupling is more efficient because of the use of the radiating surfaces of sheets 150a, 150b and because the angular region bounded by the sheets and by shield 152 has a wide azimuthal view of cold outer space. In the analogous arrangement of FIG. 10, the arrangement for coupling degraded energy to space consists of a pair of truncated cones 160, 161 forming a means similar to parabola segments 36a, 36b of FIG. 1 for radiating heat into cold space. Again, the arrangement, like that of FIG. 9, efficiently projects unwanted heat about a full azimuth sector, again serving to isolate the function of cooling the expansion chamber 39 from the effects of any other significant heat source. The truncated cones 160, 161 are respectively provided with flanges 162, 163 at a central aperture which may be rectangular in shape so that flanges 162, 163 may be respectively fastened in good heat transfer fashion to respective sides of sections 38 and 40 of the laser device. Other variations of the invention adapted for terrestrial or extraterrestrial use of the energy generated by the device will be apparent from the foregoing to those skilled in the art.

As seen in FIG. 10, the novel power system may be stabilized by a conventional stabilization element or elements represented at 170 and 172 in the lower part of FIG. 10 as supported by support links 165a, 165b, and 165c and frame 171 from the platform frame 37. Stabilization device 170 may be a conventional sun tracker linked by multiple conductors 173 to a conventional control device 172. Device 172 may include various known stabilization devices, including controlled moment gyroscopic devices of the kind disclosed in the S. P. Liden U.S. Pat. No. 3,741,500 issued June 26, 1973 for a "C M G Fine Attitude Control System" or known radio stabilization devices.

It is seen that the invention is a satellite device for the efficient collection of unattenuated wide band solar energy at a station normally outside of the earth's atmosphere and for its relatively efficient conversion in a single closed loop conversion process at that station into coherent infrared energy which may be propagated as a narrow beam, relatively unattenuated by the earth's atmosphere, for collection and beneficial use remote from the extraterrestrial station. Employing a single conversion process, the satellite station is relatively compact and relatively efficient, providing a beam of infrared energy propagating through the earth's atmosphere with relatively little loss. Short-lived and relatively inefficient components, such as solar cells, are avoided as principal elements, as well as components requiring operation at high voltages. Further, complex phase and frequency controls are unnecessary. Direction of the compact beam of coherent infrared energy beam is relatively simpler than the direction of a microwave energy beam, the latter being inherently characterized by a significantly wider angular spread.

The invention additionally has the advantages considered to be significant features of the prior art. For example, being in geosynchronous orbit, it is exposed to far more solar energy than is available in those areas on earth that normally receive copious solar energy, and furthermore, it is available nearly continuously. Because the satellite is geosynchronous, its location can be selected at a desirable place over a preferred site on the earth's surface, for example.

While the invention has been described in its preferred embodiments, it is to be understood that the words which have been used are words of description rather than of limitation and that changes within the purview of the appended claims may be made without departing from the true scope of the invention in its broader aspects.

What is claimed is:

1. Apparatus for operation at a stabilized extraterrestrial geosynchronous satellite station for the conversion of solar radiation into a compact beam of infrared energy directed to perform work at a predetermined second station, comprising:
   gas laser means including:
      solar energy absorber means,
      transverse flow gas laser means, and
      thermal radiator means for radiation of degraded thermal energy,
      said transverse flow gas laser means being characterized by producing a compact beam of infrared radiation, when said solar energy absorber means is excited by solar energy, along a first path,
   solar radiation collector means normally oriented for maximum coupling of solar energy into said solar energy absorber means along a second path at a substantially right angle to said first path,
   radiant energy directive means coupled to said thermal radiator means for coupling degraded energy into space generally in at least a part of a plane substantially perpendicular to said second path and spaced from said first path whereby said thermal radiator means is substantially shielded from solar radiation and from said infrared beam,
   said solar energy absorber means, said transverse flow gas laser means, and said thermal radiator means forming closed envelope means of a common cavity for enclosure of a lasable gas, and
   gas conduit means connecting said common cavity at said thermal radiator means to said common cavity at said solar energy absorber means for forming closed loop gas conduit means,
   discharge valve means within said common cavity disposed between said solar energy absorber means and said transverse flow gas laser means, and
   pump means in serial relation in said gas conduit means for raising the pressure of gas within said solar energy absorber means to a predetermined level in cooperation with said solar energy when said discharge valve means is closed.

2. Apparatus as described in claim 1 further including gas expansion means within said common cavity disposed between said transverse flow gas laser means and said thermal radiator means for cooling said flowing gas when said discharge valve means is opened upon reaching said predetermined pressure level.

3. Apparatus as described in claim 2 wherein said transverse flow gas laser means includes:
   first and second mirror means cooperating with said lasable gas, when flowing, for forming a lasing cavity having an axis substantially coincident with said first path,
   said first mirror means being substantially totally reflecting,
   said second mirror means having a first portion substantially totally reflecting and a second portion substantially totally transmitting, and
   said second mirror forming a portion of said closed envelope means,
   whereby laser oscillations may be maintained in said lasing cavity and said compact beam of infrared energy is propagated along said first path.

4. Apparatus as described in claim 3 wherein:
   said second mirror means is composed of a selected material of the infrared energy transmitting class including ZnSe, CdTe, or GaAs, and
   said first portion of said second mirror means is coated with a layer of an infrared reflecting material.

5. Apparatus as described in claim 2 wherein said lasable gas includes a major portion of nitrogen and minor portions of carbon dioxide, helium, water vapor, or mixtures thereof.

6. Apparatus as described in claim 1 further including:
   pressure pick off means for providing a measure of the gas pressure within said solar absorber means, and
   remotely located means for utilizing said measure.

7. Apparatus as described in claim 6 wherein said remotely located means comprises means for monitoring said measure.

8. Apparatus as described in claim 1 further including:
   level sensor means responsive to the level of said compact beam of infrared radiation,
   means for utilizing said measure for control purposes.

9. Apparatus as described in claim 8 wherein said means for utilizing said measure comprises monitor means.

10. Apparatus as described in claim 1 further including remote control means for cyclically controlling cooperative operation of said pump means and of said discharge valve means according to a predetermined program.

11. Apparatus as described in claim 1 further including:
   by-pass conduit means for by-passing said pump means, said by-pass conduit means including by-pass valve means, and
   remote control means for operating said by-pass valve means for permitting continuous flow of gas through said closed loop gas conduit means.

* * * * *